March 29, 1955  F. C. EASTMAN  2,705,298
LIMIT DEVICE FOR REMOTE GUN CONTROL SYSTEMS
Filed Sept. 13, 1948  8 Sheets-Sheet 1

Inventor
Fred C. Eastman
By his Attorney

March 29, 1955 F. C. EASTMAN 2,705,298
LIMIT DEVICE FOR REMOTE GUN CONTROL SYSTEMS
Filed Sept. 13, 1948 8 Sheets-Sheet 2

Inventor
Fred C. Eastman
By his Attorney

March 29, 1955  F. C. EASTMAN  2,705,298
LIMIT DEVICE FOR REMOTE GUN CONTROL SYSTEMS
Filed Sept. 13, 1948  8 Sheets-Sheet 3

Inventor
Fred C Eastman
By his Attorney

Inventor
Fred C. Eastman
By his Attorney

March 29, 1955  F. C. EASTMAN  2,705,298
LIMIT DEVICE FOR REMOTE GUN CONTROL SYSTEMS
Filed Sept. 13, 1948  8 Sheets-Sheet 8

Inventor
Fred C. Eastman
By his Attorney

United States Patent Office 2,705,298
Patented Mar. 29, 1955

2,705,298

LIMIT DEVICE FOR REMOTE GUN CONTROL SYSTEMS

Fred C. Eastman, Marblehead, Mass., assignor to United Shoe Machinery Corporation, Flemington, N. J., a corporation of New Jersey Application September 13, 1948, Serial No. 49,021

4 Claims. (Cl. 318—19)

This invention relates to the control of guns projecting from airplanes, and is particularly concerned with those arrangements in which the training of the gun is automatically controlled from a position within the plane, the training mechanism being driven electrically and controlled electrically.

Many different arrangements have been devised which enable a gun projecting from an airplane to be controlled automatically from within the fuselage as, for example, by the copilot who operates a sighting mechanism in the cabin. Sometimes these guns have been trained hydraulically and sometimes electrical driving motors have been used to swing the guns up and down in a gun column or to rotate the gun column to train the guns in azimuth. One manner of control with such an electrical drive involves the utilization of a special supply generator, the field of which is controlled by signals derived from self-synchronous receivers.

It is well recognized that some sort of a cover or fairing must be provided between the guns and the edges of the opening in the fuselage through which the guns project in order that the aerodynamics of the plane may not be too much disturbed by these projecting parts. Such fairing means make provision for the movements of the gun and it is usual to provide jointed sections having a shutter-like arrangement which maintain a continuous closure.

One object of the invention is to provide an improved electrical control for the training of the gun and by means of which the limits of movement of the gun within a cone of fire may be automatically determined in a simple and positive manner.

In accordance with features of the invention, the illustrated control mechanism involves a special transformer in which, when the gun reaches its limit of movement, a signal is induced which may be combined directly with the signal of the self-synchronous receiver to oppose the latter and stop the movement of the gun even though the pilot may be trying to swing the gun still farther in his effort to keep the sight upon the target. The improved arrangement is self-reversing and permits the immediate resumption of control by the self-synchronous receiver as soon as the sight is brought back within the prescribed limits and no special mechanism is needed to bring the gun back to operating condition.

As herein illustrated the plane is provided with an articulated fairing which may be interposed between the rim of an opening through which the mount projects and a portion of the gun support to keep this space continuously closed. This fairing comprises segments of hollow spheres which overlap one another and are provided with flanges preventing any opening from forming between the segments. These and other features of the invention will best be understood from a consideration of the following specification taken in connection with the accompanying drawings, in which Fig. 1 is a plan view showing two guns mounted on opposite sides of the nose of the fuselage of an airplane;

Figure 1:
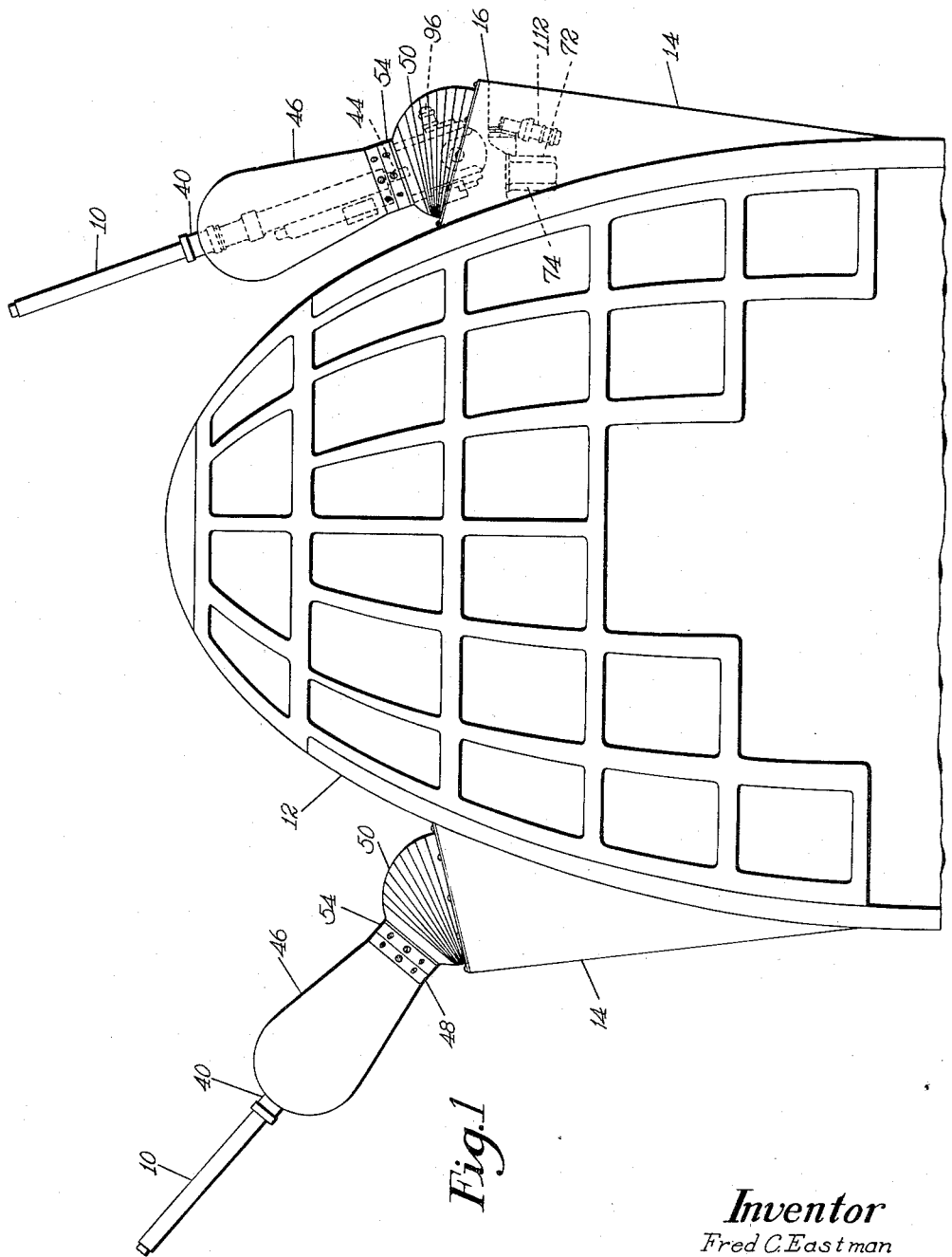
Figure 6:
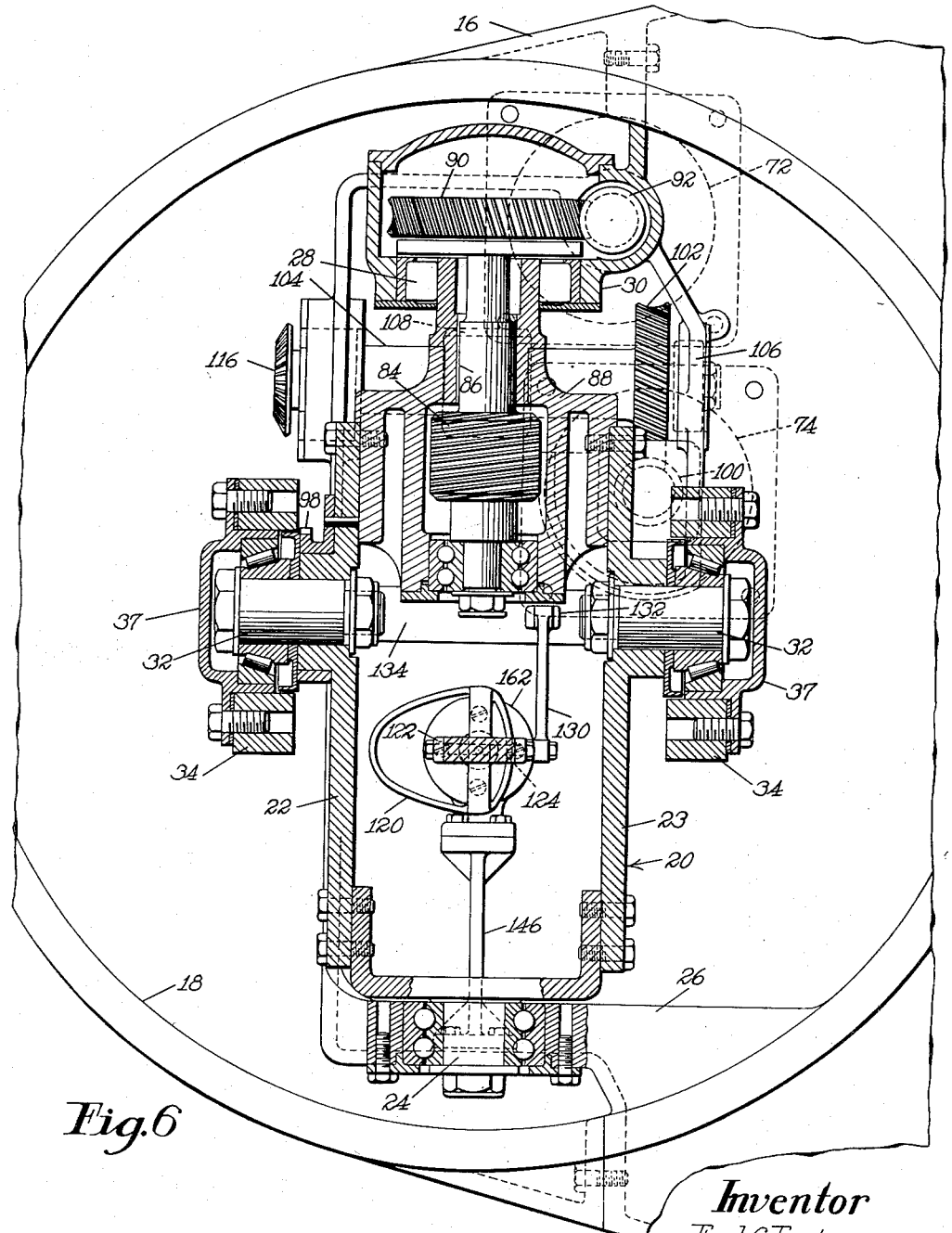
Fig. 6 is a vertical section on the line VI—VI of Fig. 5.
Figure 7:
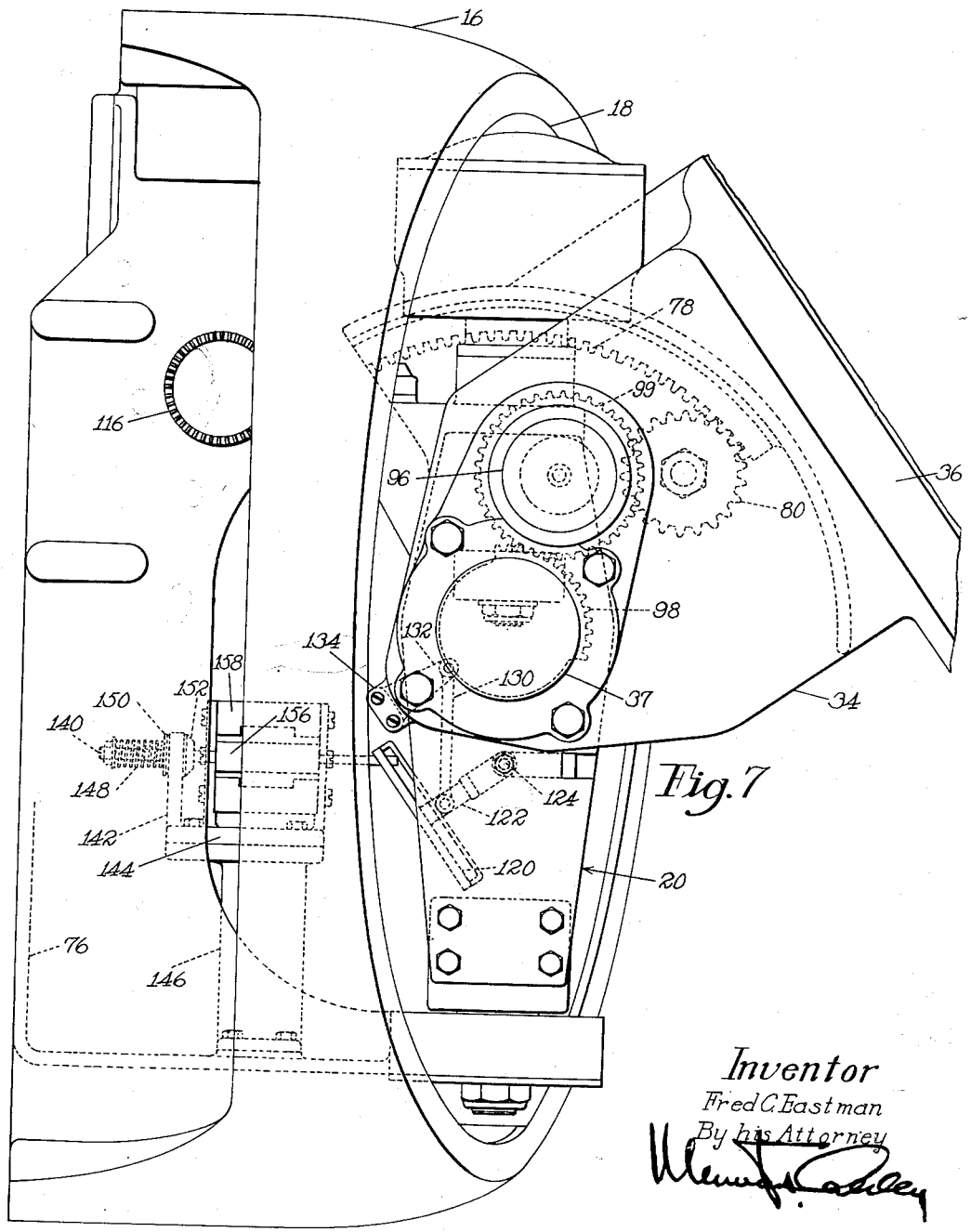
Fig. 7 is a view similar to Fig. 5 but showing the gun adaptor in elevated position.

In the arrangement shown in Fig. 1 two guns 10 (illustrated as .50 caliber Browning machine guns) are mounted for automatic operation upon the opposite sides of a fuselage 12 at the nose of an airplane and they are carried by hollow supports 14 each of which terminates at its forward end in a neck frame 16, secured by brackets to the airplane fuselage, and provided with a circular opening 18 (Fig. 6). In each opening 18 there is mounted a column yoke 20 having spaced sides 22, 23 and provided with a pivot 24 which permits the column yoke to swing about a vertical axis in a bracket 26 extending into the neck frame 16 from the fuselage thereby to swing the gun in azimuth. A bearing 28 for the upper end of this column yoke is supported in a bracket 30 which is attached to the fuselage.

Figure 2:
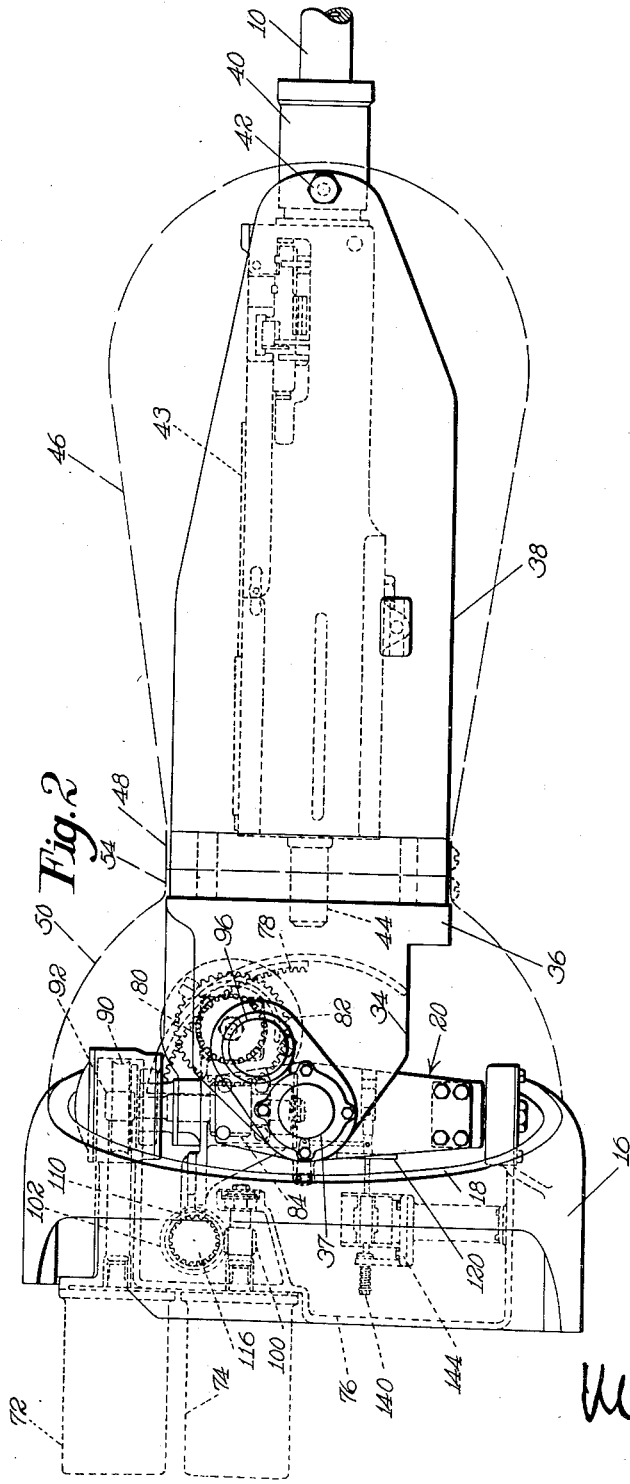
Fig. 2 is a side elevation of a gun mount with the fairing removed.

For elevation of the gun, trunnions 32 are provided on the sides 22, 23 of the column yoke, these trunnions 32 receiving bearings in the side arms 34 (Figs. 2 and 5) of a U-shaped adaptor 36. The ends of the trunnions and their bearings are protected by caps 37. To the base of the adaptor 36 is bolted the base of another U-shaped adaptor member 38. A barrel of the gun 10 is received in a sleeve 40 bolted at 42 to the outer ends of the side arms of the adaptor member 38. At the back end of a breech casing 43 on the gun, a buffer tube 44 is received in an aperture in the bases of the adaptor members 36, 38.

Figure 3:
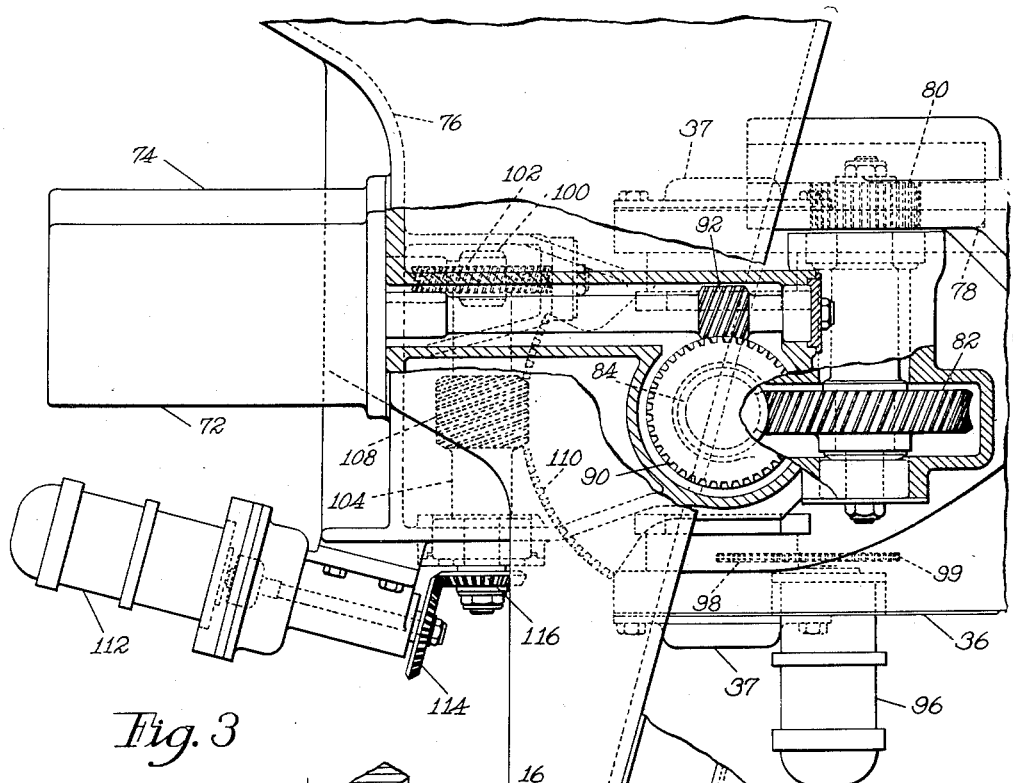
Fig. 3 is a plan view on a larger scale showing the drives for the gun mount to move it in elevation and in azimuth.
Figure 8:
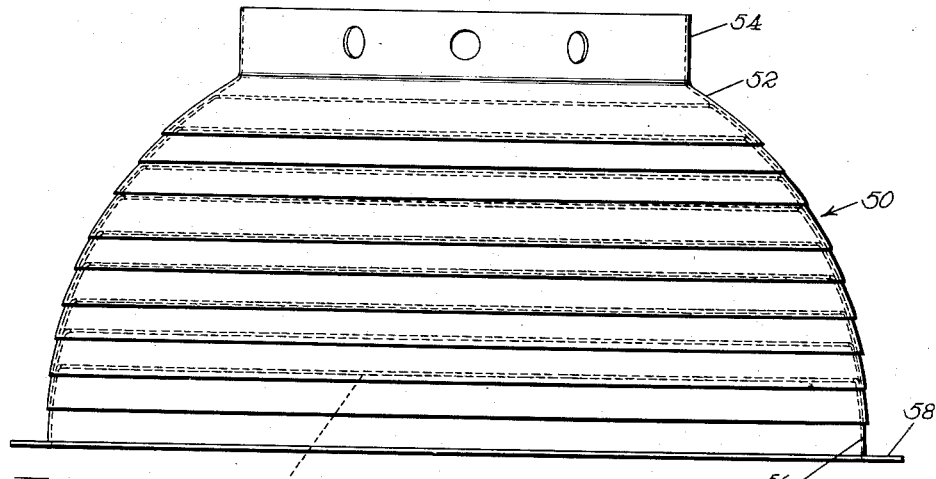
Fig. 8 is an enlarged view of the articulated fairing which includes a portion of the gun drive.
Figure 9:
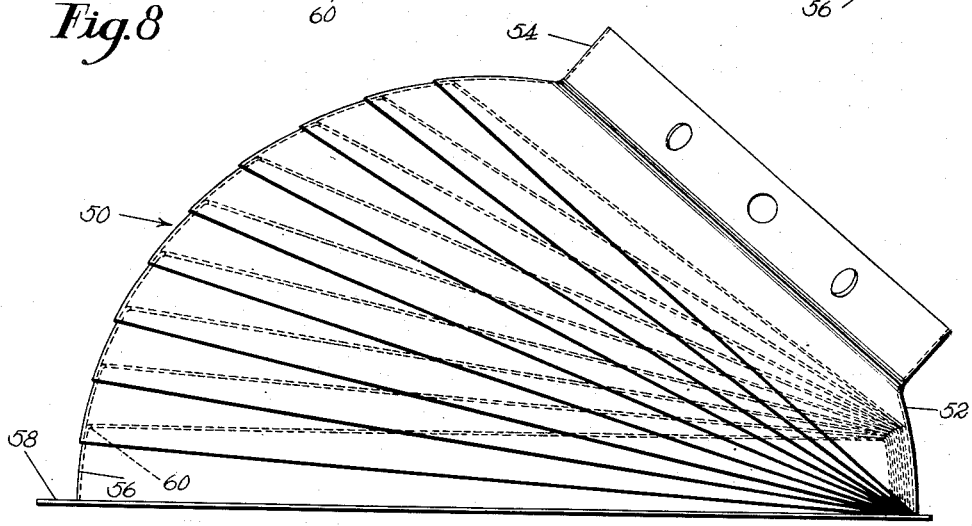
Fig. 9 shows this fairing in a tilted position with one side collapsed.
Figure 10:
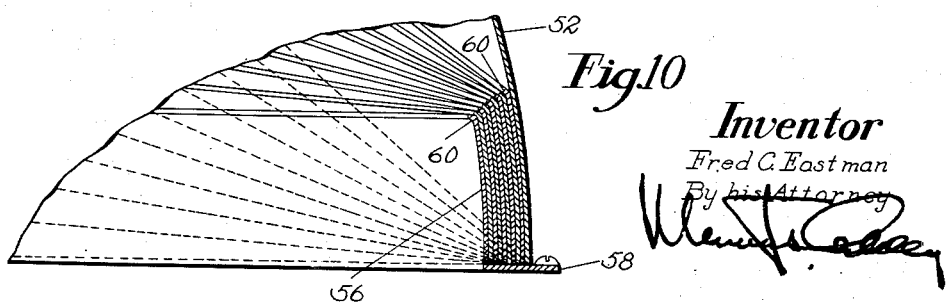
Fig. 10 is an enlarged section through the collapsed side of the articulated fairing.

The outer adaptor member 38 is covered by a bulb-shaped fairing 46 (Fig. 1) having a neck 48 secured to the base of the adaptor and the opening 18 of the neck frame 16 is covered by an articulated fairing 50 made up of a series of nesting sections formed by parallel cuts through a hollow sphere. The outer section 52 of this fairing has a neck 54 (Fig. 8) which surrounds the base of the adaptor 36 at the place where the adaptor members 36, 38 are bolted together. The innermost section 56 of the fairing 50 has a flange 58 which rests against the neck frame 16 (Fig. 3) adjacent to the opening 18. The inner and outer edges of these various sections are parallel and it will be noted that the outer smaller rims have slightly inturned flanges 60. These flanges contact at one side when the fairing is tilted to approximately its maximum amount and keep the segments always in proper order. Thus separation of the sections is prevented at that side of the spherical assembly where the sections are spread out.

Figure 5:
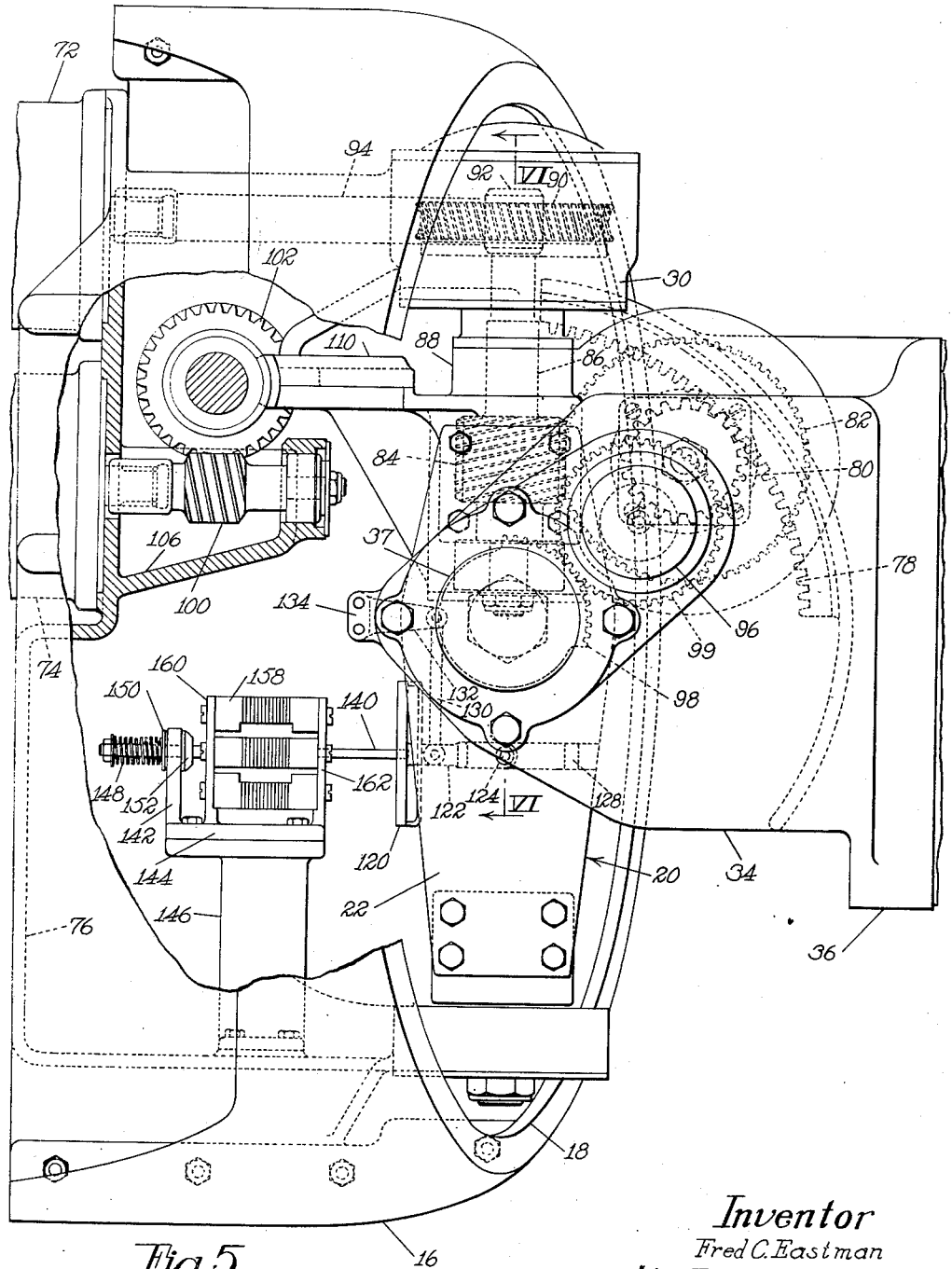
Fig. 5 is a side elevation on a still larger scale of the drives for the gun mount.

In order to provide for pointing the gun by remote control, the apparatus comprises an elevation drive motor 72 (Figs. 2 and 5) and an azimuth drive motor 74 which are supported on a partition 76 attached to the neck frame 16. Vertical swinging of the adaptors about the trunnions 32 to elevate or depress the gun is effected by supplying power from the motor 72 to a segmental rack 78 fastened to the adaptor member 36. Meshing with this segmental rack is a pinion 80 having on the same shaft a worm wheel 82 which is driven by a worm gear 84 which is mounted on a vertical shaft 86 (Figs. 5 and 6). This shaft is rotatable in bearings formed in a transverse member 88 forming the upper end of and bolted to the sides of the column yoke 20. At its upper end the shaft has a worm wheel 90 which meshes with a worm gear 92 on a motor shaft 94 connected to the motor 72. The movement of the gun in elevation is communicated to the rotor of a self-synchronous receiver 96 by means of a segmental rack 98 (Figs. 5 and 6) secured to the side member 22 of the column yoke. This meshes with a gear 99 on the shaft of the receiver 96.

Movement of the gun in azimuth is effected by swinging the column yoke 20 about its axis. This is effected by the azimuth motor 74 which drives a worm gear 100 (Fig. 5) meshing with a worm wheel 102 which is mounted on a horizontal shaft 104 (Fig. 3) rotatably supported in a bracket 106 (Fig. 6) which forms part of the partition 76. On this shaft there is a worm gear 108 which meshes with a curved segment 110 projecting rearwardly (Figs. 3 and 5) from the column yoke 20. This movement is communicated to a self-synchronous receiver 112 (Fig. 3) through bevel gears 114 and 116. In the particular design which is herein illustrated provision is made for a movement in azimuth 20° inside (Fig. 1) of a fore-and-aft line passing through the axis of the column yoke 20, and 50° outside of that line. Movement in elevation is restricted to a total of 90°, i. e. 45° above the horizontal and 45° below the horizontal.

Figure 4:
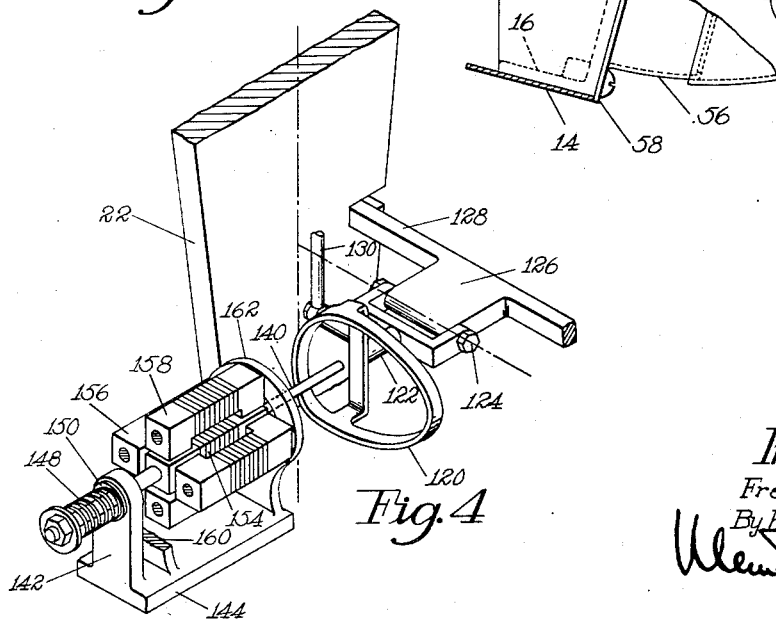
Fig. 4 is an angular view of part of the limit stop mechanism.

To restrict the movements of the gun to these limits apparatus has been provided comprising a ring-shaped template 120 to which there will be imparted a range of movement bearing an exact relation to the movement of the gun. To this end the template 120 (Figs. 4 and 5) is supported by a connecting arm 122 which is forked at its inner end so that it may be hinged upon a pivot rod 124 passing through a lug 126. This lug is carried by a cross bar 128 which is rigid with the sides 22, 23 of the column yoke. The axis of the pivot pin 124 lies in a vertical plane bisecting the sides 22, 23 of the column yoke and hence containing the pivotal axis about which that yoke moves in azimuth. This arrangement forces the ring 120 to move in azimuth in direct proportion to the movement of the gun. Movement of the ring heightwise in proportion to the changes in elevation of the gun is effected by means of a vertical rod 130 hinged at its lower end to the connecting rod 122 and at its upper end to an arm 132 (Figs. 5 and 6) extending forwardly from a cross bar 134 which joins the rear ends of the side arms 34 of the adaptor 36. By this arrangement heightwise movements of the ring template 120 are in direct proportion to the movements of the gun in elevation.

The template 120 coacts with a rod 140 which is supported for tilting movement in an aperture of an upright 142 carried by a base 144 which is supported on a standard 146 bolted to the partition 76. This rod is held normally in a centralized position by means of a surrounding spring 148 pressing against a cup-like washer 150. On the rod is a fixed flange 152 which prevents movement of the rod to the left (Figs. 4 and 5) under the action of the spring 148. Whenever the gun approaches the limit of its movement in any direction the ringlike template 120 will contact the forward end of the rod 140 and tilt it in a corresponding direction. Use is made of this movement of the rod to set up a voltage which may be opposed to the voltage of the control apparatus to be later described which is trying to move the gun beyond the prescribed limits.

Accordingly the rod 140 is provided with a primary core 154 (Fig. 4) which is positioned between pairs of secondary cores 156, 158 and may be provided with a separately excited winding 180 (Fig. 11) if necessary. These cores are supported upon vertical plates 160, 162 which are mounted on the base 144. Windings are provided on these cores as will be later described and when the primary core 154 which comprises an armature of high permeability, approaches one of the other cores it induces in the winding of that core a voltage which is greatly increased because of the reduction in the air gap between them. At the same time the voltage induced in the winding on the other core of its pair is greatly decreased because of the increased air gap.

Figure 11:
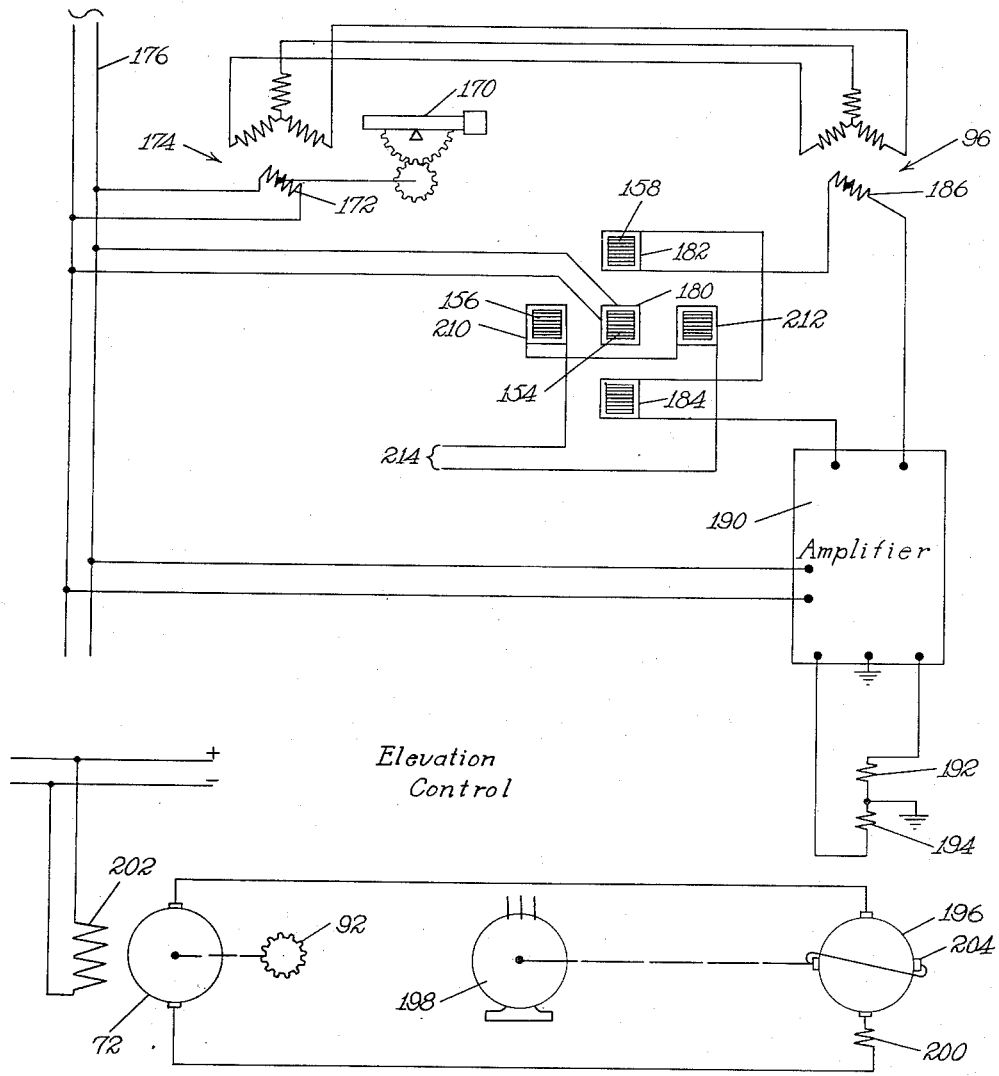
Fig. 11 is an electrical diagram showing the relation of the limit stop mechanism to the circuits of the motor drive mechanism.

The action of these voltages will be more evident from a consideration of the wiring diagram in Fig. 11 which shows that portion of the whole arrangement which is utilized for elevation control. An operator-moved control sight 170 is mechanically connected to the rotor 172 of a sending self-synchronous transmitter 174, the stator of which is directly connected electrically to the stator of the receiver 96. The rotor 172 of the transmitter 174 is energized from a source 176 of alternating current which is also employed to energize the primary winding 180 on the primary core 154 of the special transformer shown in Fig. 4. When, as a result of movement of the gun in elevation, the primary core 154 is tilted up or down by the ring template 120 then it will approach one and leave the other of the windings 182, 184 upon these secondary cores 158 which lie above and below the primary core. The windings 182, 184 are connected in bucking relation and are placed in series with the rotor winding 186 of the self-synchronous receiver 96, thereby to combine their voltages vectorially. Inasmuch as the winding 186 is on a rotor mechanically connected, as by rack 98, to the gun moving in elevation, the voltage across that winding is an error voltage dependent on the divergence between the desired position as represented by the position of the transmitter rotor and the actual position as represented by the position of the receiver rotor. A composite signal voltage is thus delivered to the primary winding of an amplifier 190, which is also energized from the source 176, and the amplified voltage is delivered to the control fields 192, 194 of a special dynamo-electric machine 196 which is driven by a motor 198. The armature of this machine has two sets of brushes. Those which are in the axis of the control fields deliver power through a series, compensating field winding 200 to the elevation motor 72 having a separately energized field winding 202 and mechanically connected to a gear 92, already described, which is one member of a chain effective to cause elevation or depression of the gun. The voltage-responsive electrical drive system includes the dynamo-electric machine 196, which has the trade name "Amplidyne," and has also a pair of short-circuited brushes 204 which makes the apparatus very sensitive to small changes in the control fields and enables it to produce voltages varying in magnitude and polarity so that the direction and extent of rotation of the elevation motor 72 may be easily controlled. The mid point between the control fields 192, 194 is grounded to the mid point of the output of the amplifier 190. The horizontally arranged cores 156 have windings 210, 212 arranged in bucking relation and which are connected to conductors 214 which are similarly connected in series with the rotor of the receiver 112 (Figs. 1 and 3) which is turned in proportion to the movements of the gun in azimuth. Duplication of the other apparatus comprising the self-synchronous transmitter, the amplifier and the Amplidyne is also required in order to deliver power to the azimuth motor 74.

It will be understood that the electrical limit stop arrangement which has just been described is effective to define a cone of fire just as would the mechanical limit stop arrangement dscribed in United States Letters Patent No. 2,536,358, granted January 2, 1951, in my name, in which a ring-like template is so mounted as to control the operation of limit switches acting through relays to perform the same result as in this electrical limit stop. It will be observed, however, that there is no necessity in the arrangement herein described for any back-out mechanism because of the fact that, as soon as the ring-like template 120 has moved away from the rod 140, the primary core will be returned to its centralized position by the spring 148 and hence any voltages set up in the secondary windings will be neutralized leaving the control to the rotor winding 186 of the self-synchronous receiver 96 thus constituting a self-reversing electrical drive system.

In the operation of the mechanism, if the position of the rotor 186 does not correspond to the position of the rotor 172 of the self-synchronous sender 174, then a voltage will be induced in this rotor winding 186 which will operate through the amplifier and the Amplidyne to control the direction and strength of current delivered to the motor 72 which by reason of the mechanical connections already described will produce a corresponding movement in elevation either up or down as the case may be. When the limit of movement has been reached, however, so that the ring template 120 contacts the end of the rod 140 then the primary winding 180 will induce rapidly increasing voltages in the secondary windings 182, 184, the algebraic sum of which will be sufficient completely to offset the signal voltage in the receiver winding 186. As soon, however, as the sight 170 is turned in a direction so as to cause the gun to move away from the upper or lower limit as the case may be, then the primary core 154 will be centralized and the signal of the receiver rotor winding 186 will again predominate and control the action of the elevation motor 72. It should be noted that, by reason of the fact that the rod 140 is tiltably mounted for movement in any angular direction, and in view of the fact that two complete sets of control apparatus are provided, then the action will be one which is a composite of the elevation and azimuth control so that the pointing of a gun can be in any direction and so that the limits of movement within a cone of fire will be defined by the composite action of the two sets of secondary cores in the special transformer shown in Fig. 4.

Having thus described my invention, what I claim as new and desire to secure by Letters Patent of the United States is:

1. A combined follow-up and limit-control device for application to the motor drive of an object mounted for movement in a plurality of directions, said device being adapted to confine such movement within predetermined space limits, said device comprising operator-controlled means for producing an error voltage corresponding to the divergence between the position of the object and its desired position, a limit-control transformer having a voltage-inducing member yieldably supported in a central position between a pair of pick-up windings, and means connected to the object to move therewith and arranged to displace said inducing member toward one or the other of said windings only upon movement of the object beyond the limit of movement, thereby to cause said windings to produce a voltage for combination vectorially with said error voltage to determine the direction and extent of movement of said object.

2. A follow-up and limit-control device for application to the voltage-responsive motor-drive of a gun which is mounted for movement, said device being adapted to confine such movement within predetermined space limits, said device comprising a self-synchronous receiver having a winding in which there is set up a signal voltage by manual manipulation of a self-synchronous transmitter electrically connected thereto to cause the drive to produce gun movement, and means mechanically actuated by the gun to produce, just as the gun reaches the predetermined limit of its movement, a rapidly increasing voltage for combination vectorially with said signal voltage and thereupon stop further movement of the gun.

3. A self-reversing follow-up and limit-control device for training a gun mounted for limited movement and adapted to be moved by means of an automatically reversible, voltage-responsive electrical drive system, said follow-up comprising a winding embodied in a self-synchronous control system and arranged to produce an error voltage, and a transformer for producing a limit-control voltage adapted to be combined vectorially with said error voltage, the transformer having a movable magnetic device coacting with bucking windings and arranged to be moved into operative relation to one or the other of said windings by approach of the gun to its prescribed limit, connections for combining said voltages, and means for delivering the resultant voltage to said drive system.

4. A device for pointing a gun moved by voltage-responsive electrical drive systems within a prescribed cone of fire and stopping it at the periphery of said cone, which consists of a plurality of self-synchronous receiver windings for producing error voltages which control the drives of the gun in azimuth and in elevation, and an associated limit-control transformer having two sets of bucking windings arranged in planes normal to one another to represent azimuth and elevation and also having a single tiltable magnetic device arranged to be tilted toward one or more windings when the moving gun approaches in any direction the predetermined limiting cone, said transformer serving to set up nullifying voltages for combination vectorially with said receiver voltages to cause the gun to be stopped from moving beyond that periphery, connections for combining error voltages with nullifying voltages, and means for delivering the resultant voltages to the respective voltage-responsive drive systems.

References Cited in the file of this patent

UNITED STATES PATENTS

| Number | Name | Date |
|---|---|---|
| 1,183,143 | Van Dyke | May 16, 1916 |
| 1,223,524 | Rosenberg | Apr. 24, 1917 |
| 1,973,279 | Bernarde | Sept. 11, 1934 |
| 1,982,350 | Mittag | Nov. 27, 1934 |
| 2,199,971 | Sanders | May 7, 1940 |
| 2,263,465 | Levendoski et al. | Nov. 18, 1941 |
| 2,367,869 | Jones | Jan. 23, 1945 |
| 2,396,314 | Brown et al. | Mar. 12, 1946 |
| 2,407,451 | Reiniger | Sept. 10, 1946 |
| 2,408,707 | Tucker et al. | Oct. 1, 1946 |
| 2,409,406 | Trotter | Oct. 15, 1946 |
| 2,413,114 | Pontius et al. | Dec. 24, 1946 |
| 2,414,102 | Hull et al. | Jan. 14, 1947 |
| 2,415,967 | Pontius | Feb. 18, 1947 |
| 2,447,968 | Trotter | Aug. 24, 1948 |
| 2,450,551 | Harrington | Oct. 5, 1948 |
| 2,462,081 | Esval | Feb. 22, 1949 |
| 2,470,244 | Fryklund | May 17, 1949 |
| 2,511,846 | Halpert | June 20, 1950 |
| 2,516,912 | Reichel et al. | Aug. 1, 1950 |
| 2,537,083 | Peoples | Jan. 9, 1951 |

FOREIGN PATENTS

| Number | Country | Date |
|---|---|---|
| 329,107 | Italy | Sept. 2, 1935 |